US006173488B1

(12) United States Patent
Endo et al.

(10) Patent No.: US 6,173,488 B1
(45) **Date of Patent: *Jan. 16, 2001**

(54) TERMINAL INSERTION AND CORRECTION JIG

(75) Inventors: Takayoshi Endo; Masanori Tsuji; Motohisa Kashiyama, all of Shizuoka (JP)

(73) Assignee: Yazaki Corporation, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/041,707

(22) Filed: Mar. 13, 1998

Related U.S. Application Data

(62) Division of application No. 08/604,721, filed on Feb. 21, 1996, now Pat. No. 5,743,008.

(30) Foreign Application Priority Data

Feb. 23, 1995 (JP) .................................................... 7-035378
Jul. 21, 1995 (JP) .................................................... 7-185892

(51) Int. Cl.[7] .......................... H01R 43/20; H01R 43/22; B23P 19/04

(52) U.S. Cl. ................................ 29/747; 29/748; 29/762; 29/33 M; 29/758; 29/278; 439/752; 7/107

(58) Field of Search .................................... 29/842, 33 M, 29/747, 876, 887, 884, 758, 748, 593, 844, 845, 270, 278, 762; 439/752, 595; 7/107

(56) References Cited

U.S. PATENT DOCUMENTS

| | | | | |
|---|---|---|---|---|
| 3,461,533 | * | 8/1969 | Anhalt | 29/278 |
| 4,380,118 | | 4/1983 | Driver et al. . | |
| 4,383,361 | | 5/1983 | Kautz . | |
| 4,635,355 | | 1/1987 | Brinkman et al. . | |
| 4,867,705 | | 9/1989 | Yuasa . | |
| 5,160,283 | | 11/1992 | Fry et al. . | |
| 5,187,862 | | 2/1993 | Ohsumi . | |
| 5,189,788 | * | 3/1993 | Sakai et al. | 29/842 |
| 5,355,583 | * | 10/1994 | Osumi et al. | 29/33 M |
| 5,515,601 | * | 5/1996 | Maejima | 29/33 M |
| 5,519,937 | * | 5/1996 | Soriano et al. | 29/842 |
| 5,699,608 | * | 12/1997 | Nakamura | 29/748 |
| 5,816,834 | * | 10/1998 | Nimura et al. | 29/747 |

FOREIGN PATENT DOCUMENTS

| | | | | |
|---|---|---|---|---|
| 35 44 180 C2 | | 6/1986 | (DE) . | |
| 43 10 193 A1 | | 10/1997 | (DE) . | |
| 2186748 | * | 8/1987 | (EP) | 439/752 |
| 61-131386 | | 6/1986 | (JP) . | |
| 64-54678 | | 2/1989 | (JP) . | |
| 2-49656 | | 12/1990 | (JP) . | |
| 2-61783 B2 | | 12/1990 | (JP) . | |
| 4-112475 | | 4/1992 | (JP) . | |

* cited by examiner

*Primary Examiner*—S. Thomas Hughes
*Assistant Examiner*—A. Dexter Tugbang
(74) *Attorney, Agent, or Firm*—Armstrong, Westerman, Hattori, McLeland & Naughton

(57) ABSTRACT

A front end portion of the inserted terminal position correcting jig is inserted into an opening formed in a peripheral wall provided extendedly from the rear portion of a connector housing, which opening functioning as its pivot center and having a correcting operation checking member therein, thereby to shift the jig toward the housing pivoting on the opening, and by this operation the jig is fitted with the rear end portion of the terminal which is still in an incompletely inserted state so as to shift the terminal to a completely inserted position and securely locked, wherein since the correcting operation checking member formed in the opening is removed when the front end portion of the jig is inserted, whether or not the correcting operation is perfectly done can be checked from outside by a removal or deformation of the correcting operation checking member.

1 Claim, 16 Drawing Sheets

TERMINAL INSERTION AND CORRECTION JIG

This is a Divisional of application No. 08/604,721, filed Feb. 21, 1996, which issued as U.S. Pat. No. 5,743,008.

BACKGROUND OF THE INVENTION

1. Field of the Invention

The present invention relates to a connector for use in a wiring harness for motor vehicles, and more particularly to an incomplete insertion correcting method of a terminal inserted to be locked in a terminal accommodating chamber of a connector housing, and an incomplete insertion correcting jig used therefore.

2. Description of the Prior Art

In FIG. 27, a terminal c inserted into a terminal accommodating chamber b of a connector housing a is locked as a primary locking by a resilient locking piece d which is integrally formed in the connector housing a, and further, a locking tool f connected to the connector housing a by way of a hinge e is inserted into the terminal accommodating chamber b through an opening a1 as is done in the lower chamber in FIG. 27 so as to confirm the primary locked state, and A simultaneously the front end of the locking section f1 of the locking tool f is fitted with a shoulder portion c1 of the terminal c as a secondary locking for preventing the rear end thereof from coming off (Japanese Utility Model Published No. Heisei 2-49656).

Also, in FIG. 28, from the state that the same terminal is inserted into a terminal accommodating chamber b' and locked by a resilient locking piece therein as a primary locking, a locking tool f', which is constructed as a separate body from the connector housing a', is inserted into the terminal accommodating chamber b' through an opening a1'to be further locked as a secondary locking (Japanese Patent Application Laid Open No. 64-54678).

In the above situation, the secondary locking between the locking tools f, f' and the terminal c can not be performed if the terminal c is not completely inserted and primarily locked by the resilient locking piece d, as a proper insertion of the locking tools f, f' is hampered by the incompletely inserted terminal c, so that a perfect primary locking of the terminal is essential to enable a complete insertion of the locking tools f, f' into the terminal accommodating chamber. However, the modern technology provides a sufficient locking force for preventing the inserted terminal from coming off even only with a primary locking made by the resilient primary licking piece, and besides these secondary locking tools cause a raise of the manufacturing cost as a whole.

SUMMARY OF THE INVENTION

The present invention has been made in view of the above-mentioned points, and accordingly, it is an object of the present invention to provide an apparatus and a method, by which an incomplete insertion of a terminal in a terminal accommodating chamber of a connector housing can be corrected or checked, even without using a secondary locking tool.

In order to attain the above objective, the present invention provides a connector engagement correcting method for correcting an incomplete insertion of a terminal inserted into a connector housing, wherein the terminal is received in a terminal accommodating chamber in the connector housing and locked by a resilient locking piece provided in the chamber on completion of an insertion of the terminal, which method comprising the steps of; inserting a tip end of an inserted position correcting jig into an opening formed in a peripheral wall which is extendedly provided from the rear end of the connector housing; shifting the inserted position correcting jig toward the connector housing pivoting on the opening to fit it with a rear end portion of the terminal which is still in an incompletely inserted state; and pushing the terminal to a completely inserted position thereof, wherein a correcting operation checking member formed in the opening is forcibly activated to deform an external appearance of the opening when the tip end of the jig is inserted into and engaged with the opening. In the above method, the correcting operation checking member can be formed in an inner surface of the peripheral wall extendedly provided from the rear end of the connector housing, so that it is forcibly activated by the jig to deform an external appearance thereof on completion of the correcting operation performed by a shifting movement of the jig, and further, the correcting operation checking member can be formed in an another opening formed in the peripheral wall provided extendedly from the rear end of the connector housing, so that it is forcibly activated by the jig to deform an external appearance thereof on completion of the correcting operation performed by a shifting movement of the jig.

Alternatively, the present invention provides a connector engagement correcting method for correcting an incomplete insertion of a terminal inserted into a connector housing, wherein the terminal is received in a terminal accommodating chamber in the connector housing and locked by a resilient locking piece provided in the chamber on completion of an insertion of the terminal, which method comprising the steps of; shifting an inserted position correcting jig across a plurality of terminal accommodating chambers between jig insertion holes formed in the opposite side walls of the connector housing; engaging a tapered activating section formed at a tip end of the jig with an intermediate portion of each of the plurality of terminals still in an incompletely inserted state; pushing each of the terminals into a completely inserted position thereof, wherein a correcting operation checking member formed in each of the insertion holes is forcibly activated to deform an external appearance of each of the insertion holes when the tip end of the jig is inserted into and engaged with the jig insertion holes.

Alternatively, the present invention provides a connector engagement correcting method for correcting an incomplete insertion of a terminal inserted in a connector housing, wherein the terminal is received in a terminal accommodating chamber in the connector housing and locked by a resilient locking piece provided in the chamber on completion of an insertion of the terminal, which method comprising the steps of; inserting a tip end of an inserted position correcting jig into a pivot center formed in one side of a peripheral wall extendedly provided at the rear end of the connector housing; shifting the inserted position correcting jig toward the connector housing pivoting on the pivot center to fit it with a rear end portion of the terminal which is still in an incompletely inserted state; and pushing the terminal to a completely inserted position thereof, wherein a correcting operation checking member formed in the other side of the peripheral wall is forcibly activated by the jig to deform an external appearance of the wall when the correcting operation of the checking member is performed by the shifting movement of the jig, wherein the correcting operation checking member can be formed in a bridge-like shape within an opening of the wall.

In these above methods, the opening as an insertion hole of the jig is enabled to receive a checking projection on the base frame of a connector checking tool for checking an electrical conduction of the terminal by being enlarged resulted from a removal of the correcting operation checking member.

Alternatively, the present invention provides a connector engagement correcting method for correcting an incomplete insertion of a terminal inserted into a connector housing, wherein the terminal is received in a terminal accommodating chamber in the connector housing and locked by a resilient locking piece provided in the chamber on completion of an insertion of the terminal, which method comprising the steps of; inserting a tip end of an inserted position correcting jig into a pivot center formed in a peripheral wall which is extendedly provided from the rear end of the connector housing; shifting the inserted position correcting jig toward the connector housing pivoting on the pivot center to fit it with a rear end portion of the terminal which is still in an incompletely inserted state; and pushing the terminal to a completely inserted position thereof, wherein a free end section of a correcting operation checking member composed of a cantilever resilient piece formed in an opening in the wall is shifted from inner side to outer side, when the correcting operation of the checking member is performed by the shifting movement of the jig.

Alternatively, the present invention provides a connector engagement correcting method for correcting an incomplete insertion of a terminal inserted into a connector housing, wherein the terminal is received in a terminal accommodating chamber in the connector housing and locked by a resilient locking piece provided in the chamber on completion of an insertion of the terminal, which method comprising the steps of; inserting a tip end of an inserted position correcting jig into a pivot center formed in a peripheral wall which is extendedly provided from the rear end of the connector housing; shifting the inserted portion correcting jig toward the connector housing pivoting on the pivot center to fit it with a rear end portion of the terminal which is still in an incompletely inserted state; and pushing the terminal to a completely inserted position thereof, wherein a correcting operation checking member formed on the external side of the wall by way of a resilient hinge portion is activated by the jig to deform in the frontward direction along the side wall and maintained there, when the correcting operation of the checking member is performed by the shifting movement of the jig.

The present invention provides a connector housing comprising; an opening having a correcting operation checking member formed in a peripheral wall which is extendedly provided from the rear end of the connector housing, said peripheral wall having a notched portion opposite to the wall face of the opening.

Alternatively, the present invention provides a connector housing comprising; an opening having a correcting operation checking member formed in a peripheral wall which is extendedly provided at the rear end of the connector housing, and another correcting operation checking member formed on an inner surface of the peripheral wall opposite to the wall face of the opening.

Alternatively, the present invention provides a connector housing comprising; an opening having a correcting operation checking member formed in each of opposing wall faces of a peripheral wall which is extendedly provided from the rear end of the connector housing.

Alternatively, the present invention provides a connector housing comprising; a through-hole across a plurality of terminal accommodating chambers; and a jig insertion hole having a correcting operation checking member therein in the respective opposing wall faces.

Alternatively, the present invention provides a connector housing comprising; an opening at a peripheral wall extendedly protruded from a terminal accommodating chamber; and another opening having a bridge-like correcting operation checking member at the rear end opposite to the wall face of said opening.

Alternatively, the present invention provides a connector housing comprising; an opening at a peripheral wall extendedly protruded from a terminal accommodating chamber; another opening and a correcting operation checking member made of a cantilever resilient piece at one side face of the peripheral wall, wherein a free end section of said correcting operation checking member is deformable from inner side to outer side resulted from a pushing force.

The present invention also provides an inserted position correcting jig for correcting an incomplete engagement of a terminal received in a terminal accommodating chamber of a connector housing, which jig comprising; a pectinate pushing section formed at the front end portion thereof with a terminal wire receiving section at both sides thereof; which pushing section further comprising a protruded portion which can further comprise a cutting blade, wherein the pectinate pushing section further comprises another cutting blade protruded from the base portion thereof.

Other features and advantages of the invention will be apparent from the following description taken in connection with the accompanying drawing.

BRIEF DESCRIPTION OF THE DRAWINGS

FIGS. 6A and 6B are sectional views of a correcting operation checking member according to another embodiment, wherein FIG. 6A shows the state before using an inserted position correcting jig, while FIG. 6B shows the state after the use thereof;

FIGS. 7A and 7B illustrate another embodiment of the present invention, wherein FIG. 7A shows the state before using the jig, while FIG. 7B shows the state after the use thereof;

DETAILED DESCRIPTION OF THE PREFERRED EMBODIMENTS

Figure 1:
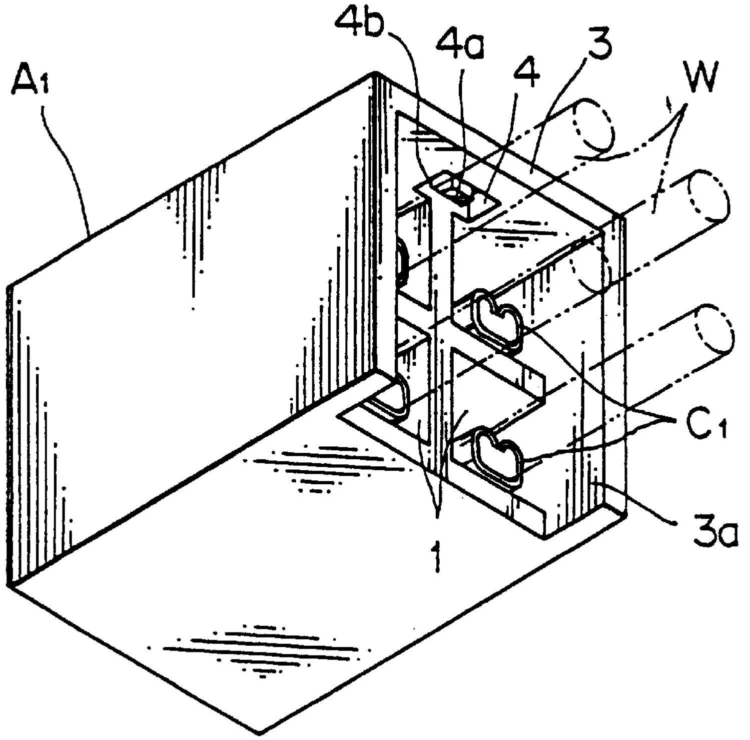
FIG. 1 is a perspective view of a first embodiment of the present invention.
Figure 2:
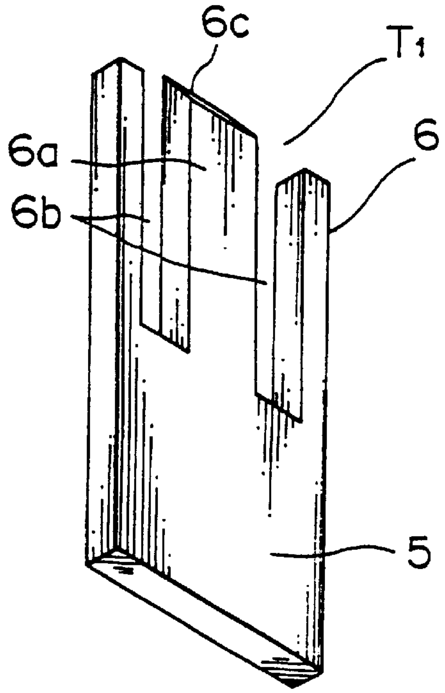
FIG. 2 is a perspective view of an inserted position correcting jig for correcting the position of an incompletely inserted terminal.
Figure 3:
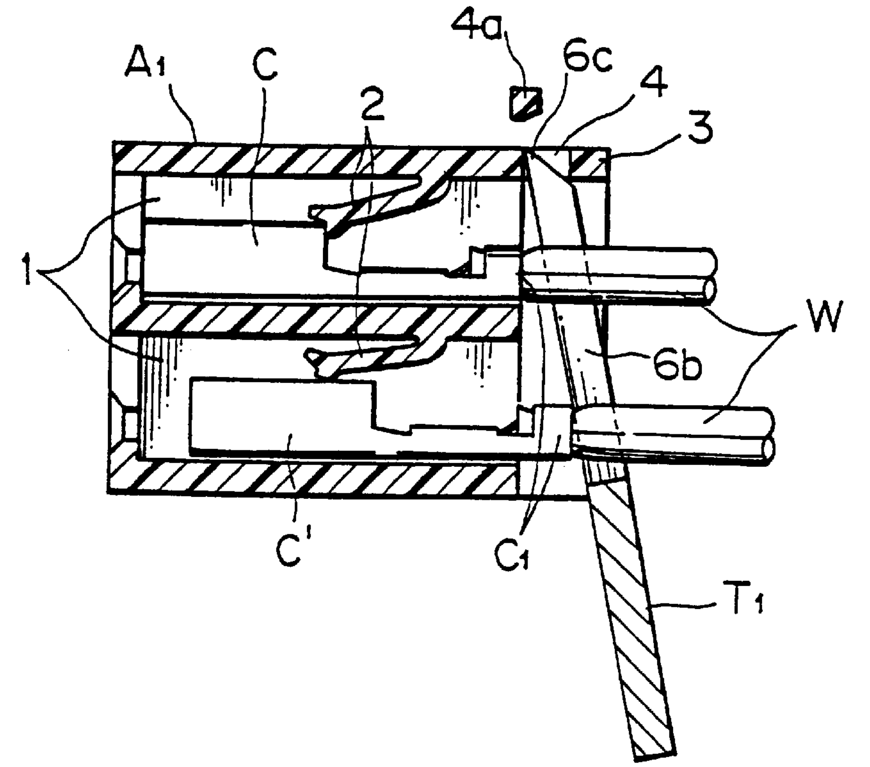
FIG. 3 is a sectional view showing an initial state of an inserted position correcting operation with respect to the terminal received in the connector housing.

In FIG. 1, a plurality of terminals C each preliminarily connected to a wire W are inserted into a plurality of terminal accommodating chambers 1, wherein each terminal C is locked by a resilient locking piece 2 integrally formed within each of the terminal accommodating chambers when it is perfectly inserted, and is thereby prevented from coming off (see FIG. 3).

In the rear side of the connector housing A1, the terminal accommodating chamber 1 is formed with a rearward projecting peripheral wall 3 with its lower wall face 3*a* notched therefrom, and an opening 4 that functions as a pivot center for an inserted position correcting jig (explained later) is formed on the upper side of the peripheral wall 3, while a correcting operation checking member 4*a* of a cantilever projection type is protruded into the opening 4 through a thin portion 4*b* thereof.

T1 is an inserted position correcting jig for correcting the position of the incompletely inserted terminal C' (FIG. 3), and formed with a pectinate pushing section 6 at the far end of the holding section 5 thereof. The pectinate pushing section 6 is further formed with a pivoting section 6*a* at its center portion, whose end portion is slightly protruded and formed with a cutting blade 6*c* forming also a wire receiving sections 6*b* at respective sides thereof.

In the above construction, the jig T1 is first placed rather obliquely against the connector housing A1 from the lower rear side thereof, and then the pivot section 6*a* thereof is inserted into the opening 4, receiving the wires W simultaneously in the wire receiving sections 6*b*. By this operation, the cutting blade 6*c* cuts off the protruded correcting operation checking member 4*a* through the thin portion 4*b* thereof (FIG. 3). Then, when the jig T1 is rotated in the direction of the connector housing A1 pivoting on the opening 4, the opposite sides 6*d* of each of the wire receiving sections 6*b* of the pectinate pushing section 6 abut A against the wire coat crimped portion C1 of the incompletely inserted terminal C' (FIG. 4), so that the terminal C' is shifted to the completely inserted position to be locked by the resilient locking piece 2 (FIG. 5).

Figure 6A:
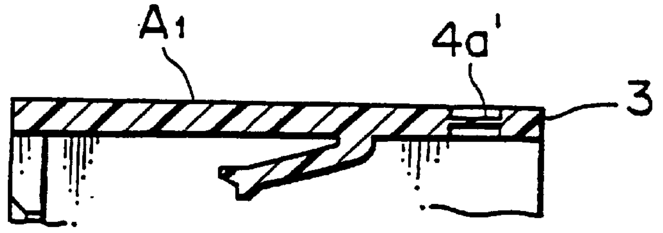
Figure 6B:
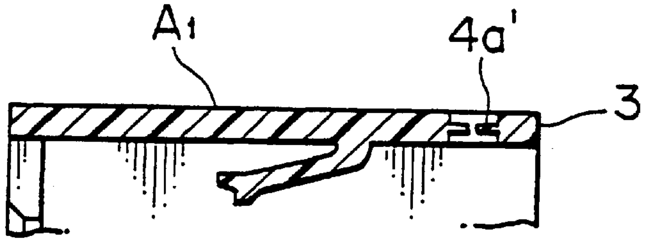

In the embodiment shown in FIGS. 6A and 6B, the correcting operation checking member 4*a*' is quite thin, and thus it is broken by use of the jig T1 (FIG. 6B).

Figure 7A:
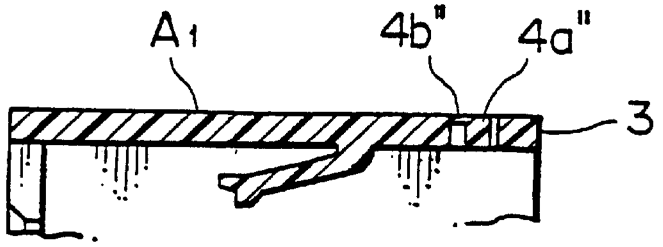
Figure 7B:
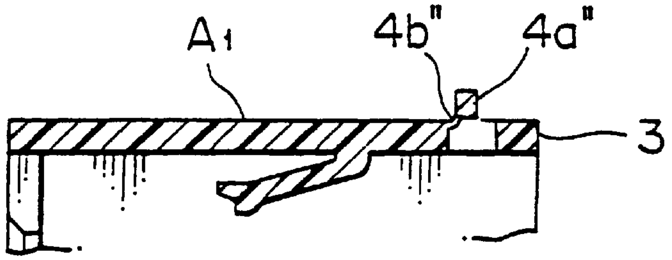

In the embodiment shown in FIGS. 7A and 7B, the correcting operation checking member 4*a*" is a portion bent by way of a hinge 4*b*", and is deformed outwardly when the jig T1 is activated (FIG. 7B).

Figure 8:
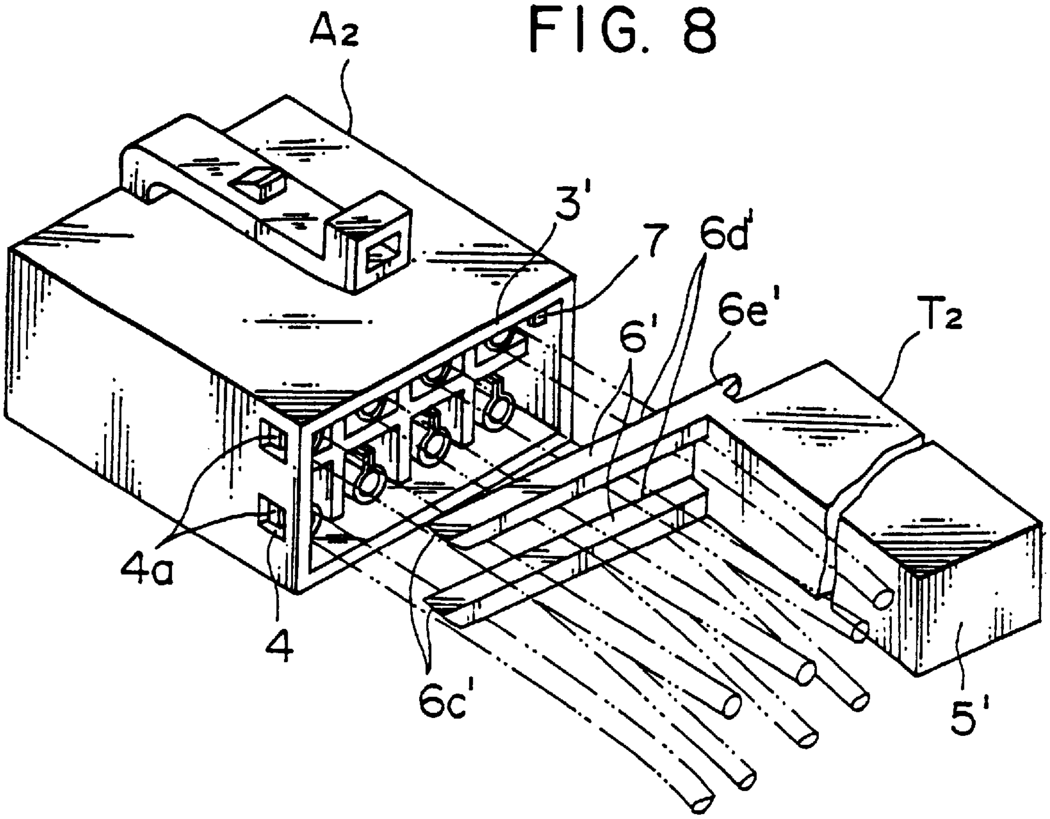
FIG. 8 is a perspective view showing a connector housing and an inserted position correcting jig according to another embodiment of the present invention.

In the embodiment shown in FIG. 8, a vertically aligned pair of openings 4 each functioning as a pivot center for an inserted position correcting jig and having a protruded correcting operation checking member 4*a* is formed either in the right or left side face of the peripheral wall 3'protruded from the rear end of the connector housing A2, wherein the protruded type correcting operation checking member 4*a* is formed in the inner surface of the other side face of the protruded wall 3' opposing to the opening 4.

The inserted position correcting jig T2 is formed with a vertically aligned pair of stick-like pushing sections 6'sidewardly extending from the front end portion thereof, wherein each of the stick-like pushing sections 6' is formed with a cutting blade 6*c*' at the far end thereof, and an abutting portion 6*e*' to be fitted with the end portion of the protruded wall 3 is formed at the base portion of the stick-like pushing sections 6'.

When using the inserted position correcting jig T2, the cutting blades 6*c*' of each of the respective stick-like pushing sections 6' is first inserted obliquely through the spaces between the wires W into the opening 4, and then the base portion of the stick-like pushing sections 6' is rotated in the direction toward the connector housings A2 until the abutting portion 6*e*' thereof is abutted against the rearwardly extended wall 3', wherein the front side section 6*d*' of each of the stick-like pushing sections 6' is fitted with the crimped portions of the incompletely inserted wires of the terminals so as to shift the terminals to the perfectly inserted position.

Figure 9:
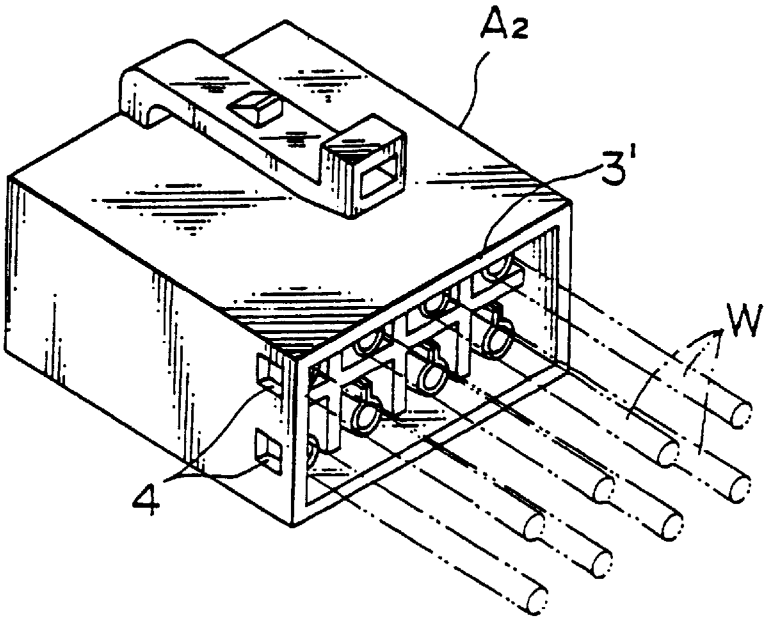
FIG. 9 is a perspective view showing the sate that the operation of the jig is completed.

When the cutting blades 6*c*' of each of the stick-like pushing sections 6' is inserted into the opening 4, the protruded correcting operation checking member 4*a* is cut off, and when the insertion is completed, each of these checking members 7 is removed by the front side section 6*d*' of the respective pushing sections 6' (FIG. 9).

In the embodiments shown in FIGS. 8 and 9, the correcting operation checking member 4*a* can be formed by a thin flange, a bent section supported by a hinge or the like instead of the above protruded form.

Figure 10:
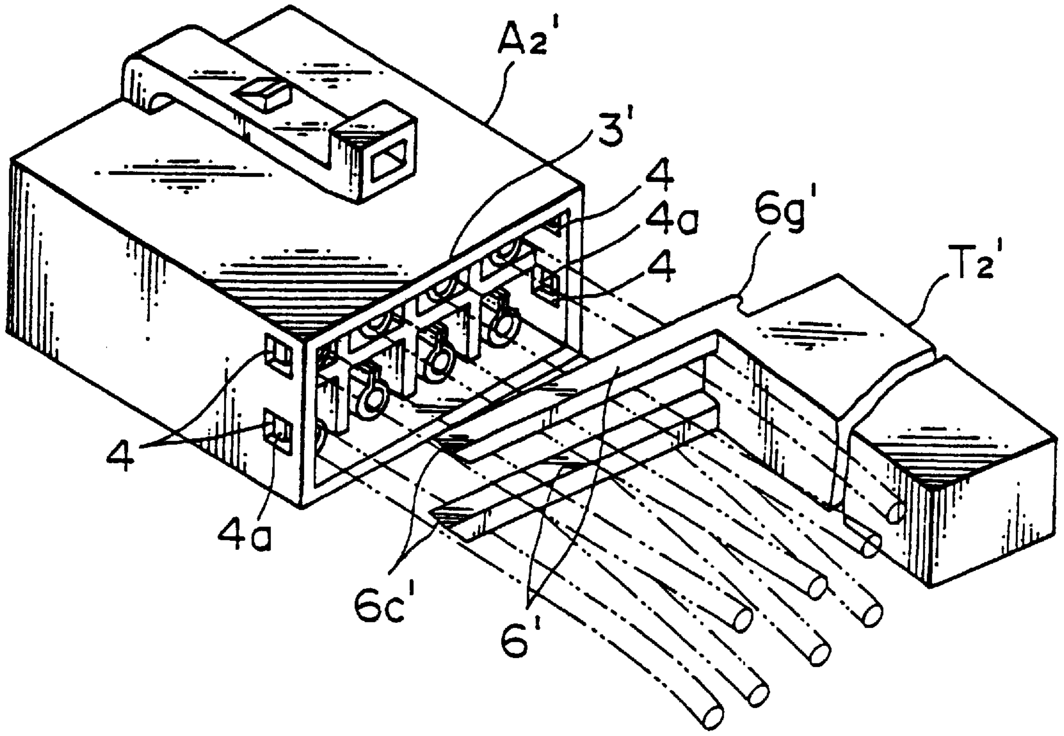
FIG. 10 is a perspective view showing a connector housing and an inserted position correcting jig according to another embodiment.

In the embodiment shown in FIG. 10, a pair of openings 4, 4 that functions as a pivot center can be formed in the opposite side wall faces of the rearwardly protruded peripheral wall of the connector housing A2' in a face-to-face relation, and at the base portion of each of the stick-like pushing sections 6' of the jig T2', an activating projection 6*g*' is formed in an adversely protruding manner.

In this case above, it is possible to disregard the orientation of the jig T1 in use, wherein when the pushing operation of the stick-like pushing section 6' is completed, the activating projection 6*g*' also inserts into the other opening 4 formed in the opposite side wall, pushing against the side wall of the connector housing A2' so as to force to remove the checking member 4*a*.

Figure 11:
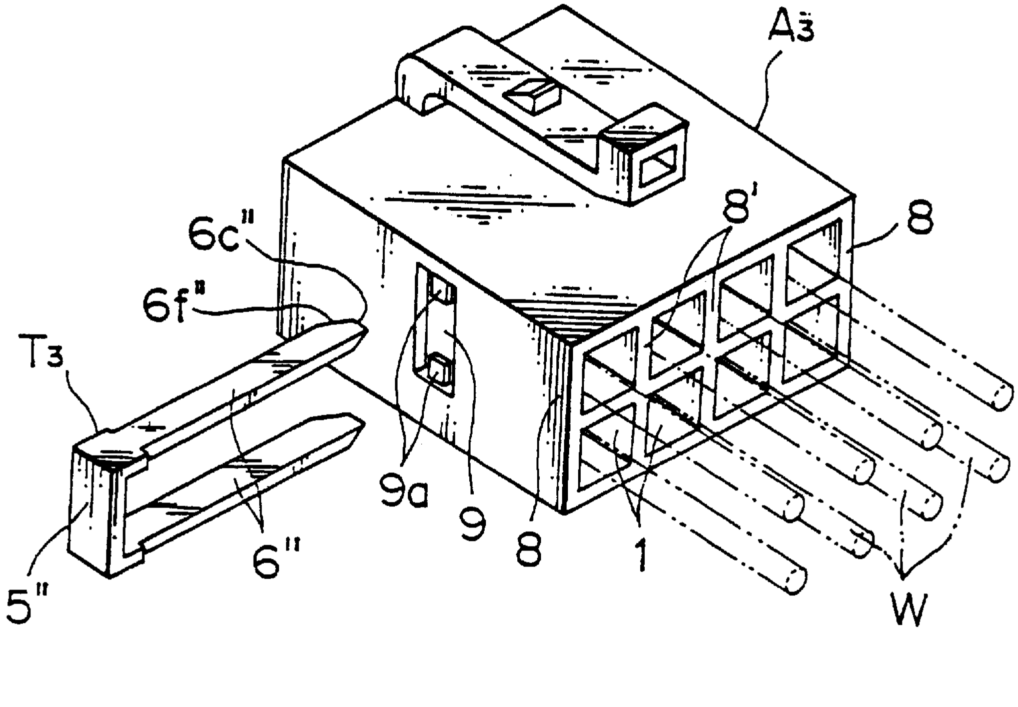
FIG. 11 is a perspective view showing a connector and an inserted position correcting jig according to another embodiment.

In the embodiment shown in FIG. 11, in the opposite side walls 8, 8 of the connector housing A3, a jig insertion hole 9 for receiving the jig T3 is formed in a vertically extending manner across the terminal accommodating chambers 1, 1, wherein a pair of protruded type correcting operation checking members 9*a*, 9*a* are formed respectively from the upper and lower sides of the jig insertion hole 9 in an inwardly projecting manner.

The jig T3 is formed with a pair of stick-like pushing sections 6", 6" extending respectively from the upper and lower portions of the holding section 5" thereof, and each of the stick-like pushing sections 6" is formed with a cutting blade 6*c*" at the far end thereof and also with a tapered activating section 6*f*" facing in the forward direction of the connector housing A3.

In the above construction, a through-hole (not shown) for receiving the stick-like pushing section 6" is formed in the lateral sides of the respective separating wall 8' formed in the terminal accommodating chamber of the connector housing whereby each of the stick-like pushing sections 6" of the jig T3 can be inserted from one side wall 8 to the other side wall 8, and on inserting the pushing section 6", the correcting operation checking members 9*a*, 9*a* are removed by a pair of the cutting blades 6*c*", 6*c*", and simultaneously the tapered activating sections 6*f*", 6*f*" of the jig T3 are fitted with the respective shoulder portions C2 (FIG. 12) of each of the incompletely inserted terminals C' to force the terminal C' forward so as to be locked by the respective resilient locking pieces 2'.

Figure 12:
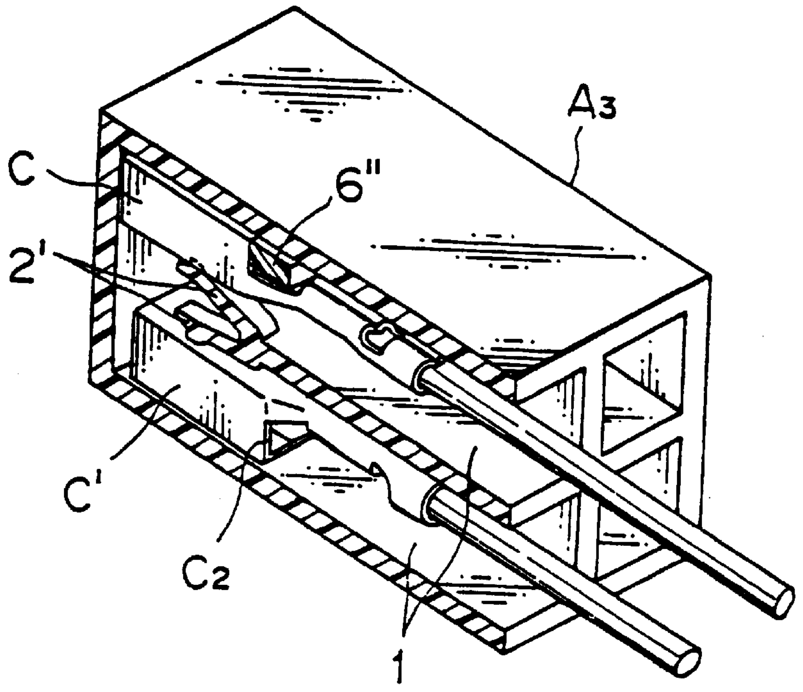
FIG. 12 is a sectional view showing the correcting process of FIG. 11.

Even in the embodiments shown in FIGS. 11, 12, the correcting operation checking member 9*a* can be formed by a thin flange, a bent section supported by a hinge or the like.

Figure 13:
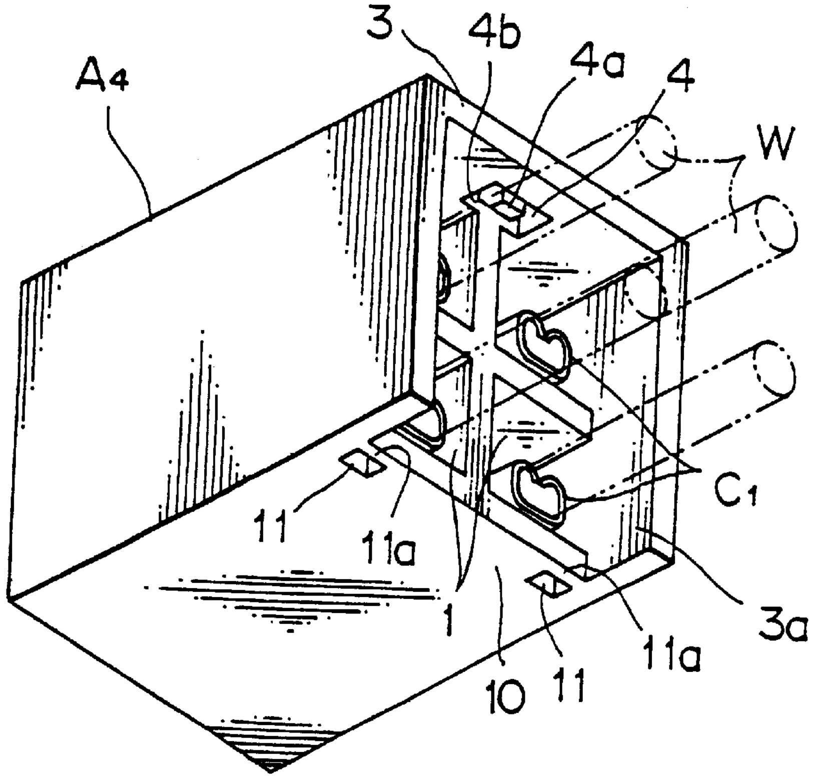
FIG. 13 is a perspective view showing a connector housing of another embodiment.
Figure 14:
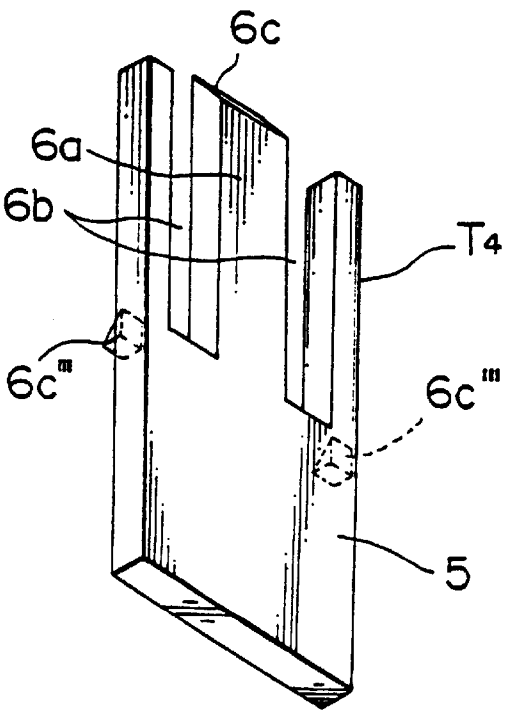
FIG. 14 is a perspective view showing an inserted position correcting jig of another embodiment.
Figure 15:
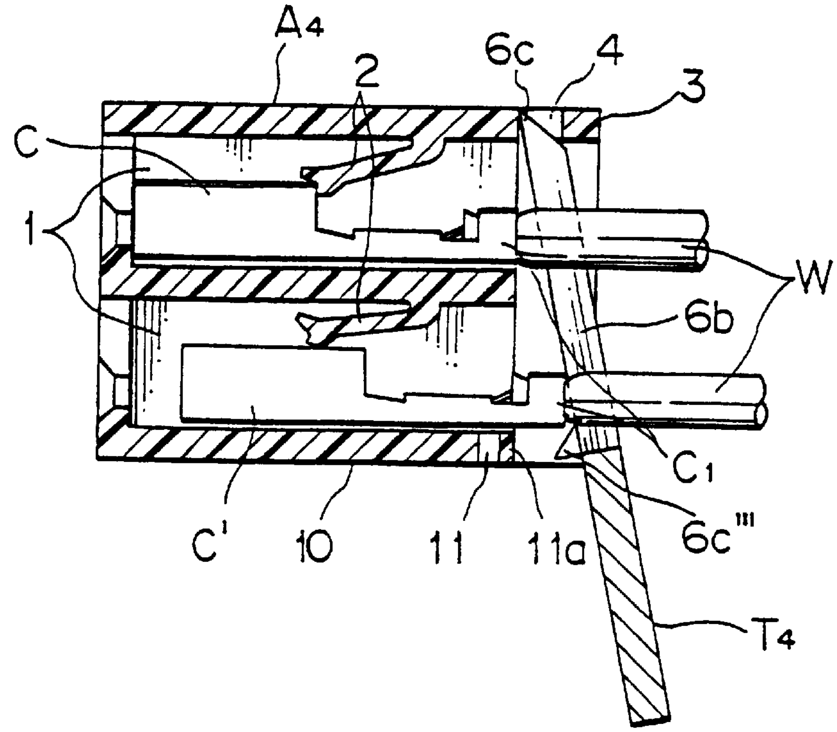
FIG. 15 is a sectional view of an initial state of the correcting operation of FIG. 14.

In the connector housing A4 shown in FIG. 13, in addition to the construction of the connector housing A1, a pair of openings 11, 11 each having a bridge-like correcting operation checking member 11*a* therein are provided at the opposite lateral sides of the rear end of the bottom wall 10 adjacent to the notched section 3*a* of the protruded peripheral wall 3. Further, as shown in FIG. 14, a pair of cutting blades 6*c*'" corresponding to the bridge-like correcting operation checking members 11*a*, 11*a* are protrudedly provided on the opposite lateral sides of the base portion of the pectinate pushing section 6 of the jig T4.

Figure 4:
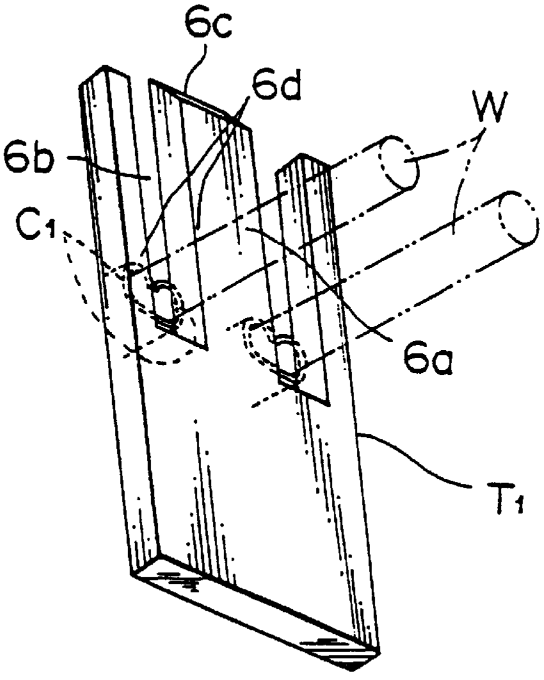
FIG. 4 is a perspective view focused on an important portion during the correcting operation.
Figure 5:
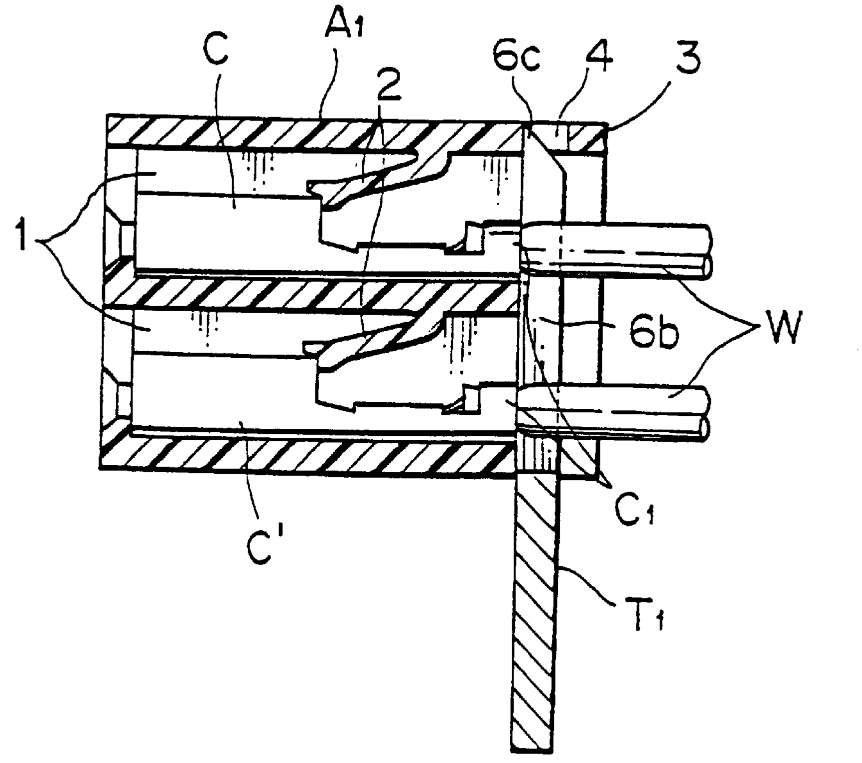
FIG. 5 is a sectional view showing the state that the correcting operation is completed.
Figure 16:
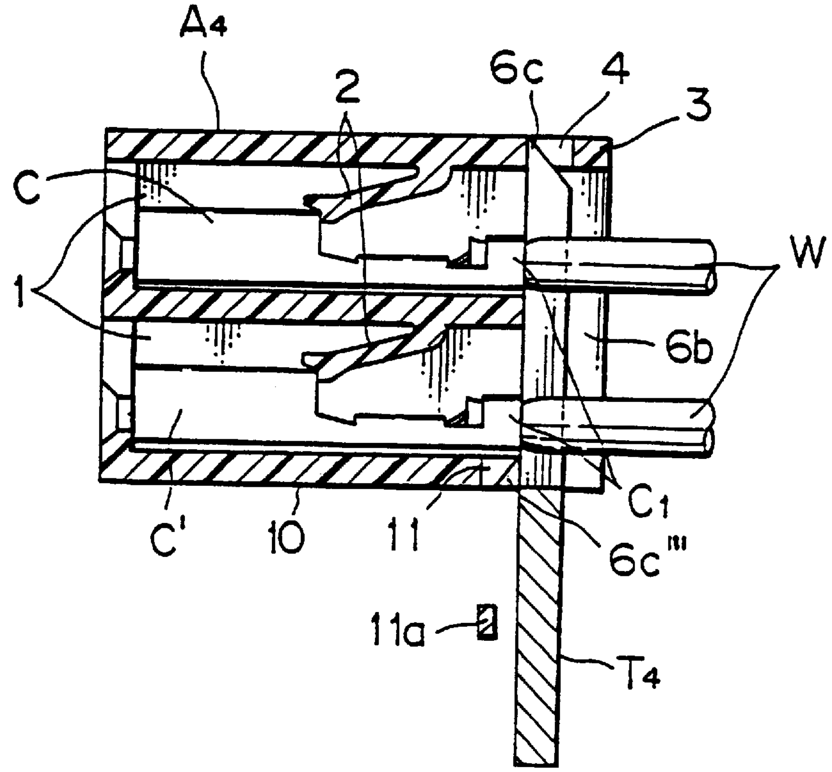
FIG. 16 is a sectional view showing the state that the correcting operation of FIG. 14 is completed.
Figure 17:
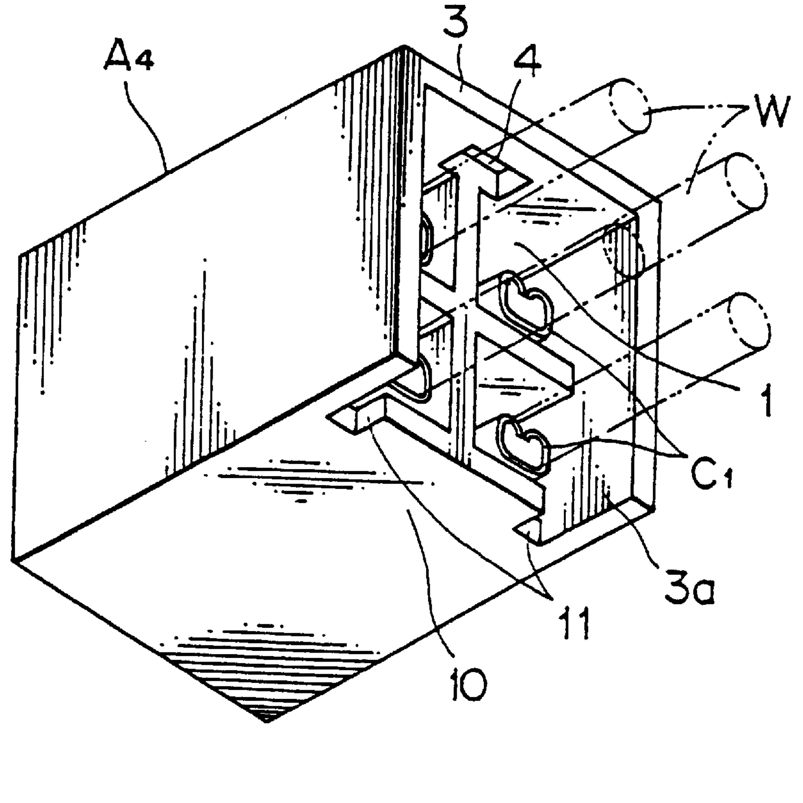
FIG. 17 is a perspective view showing the state that the correcting operation of the above jig is completed.

When the jig T4 is used, each of the cutting blades 6*c*'" cuts off the corresponding bridge-like correcting operation checking member 11*a* of the connector housing A4 at the final stage of the correcting operation in addition to the procedures shown in FIG. 3 to FIG. 5, whereby the openings 11, 11 are opened toward the rear end of the housing (FIGS. 16, 17). It is to be noted that the correcting operation checking member 4*a* of the opening 4 can be, in this case above, omitted.

Figure 18:
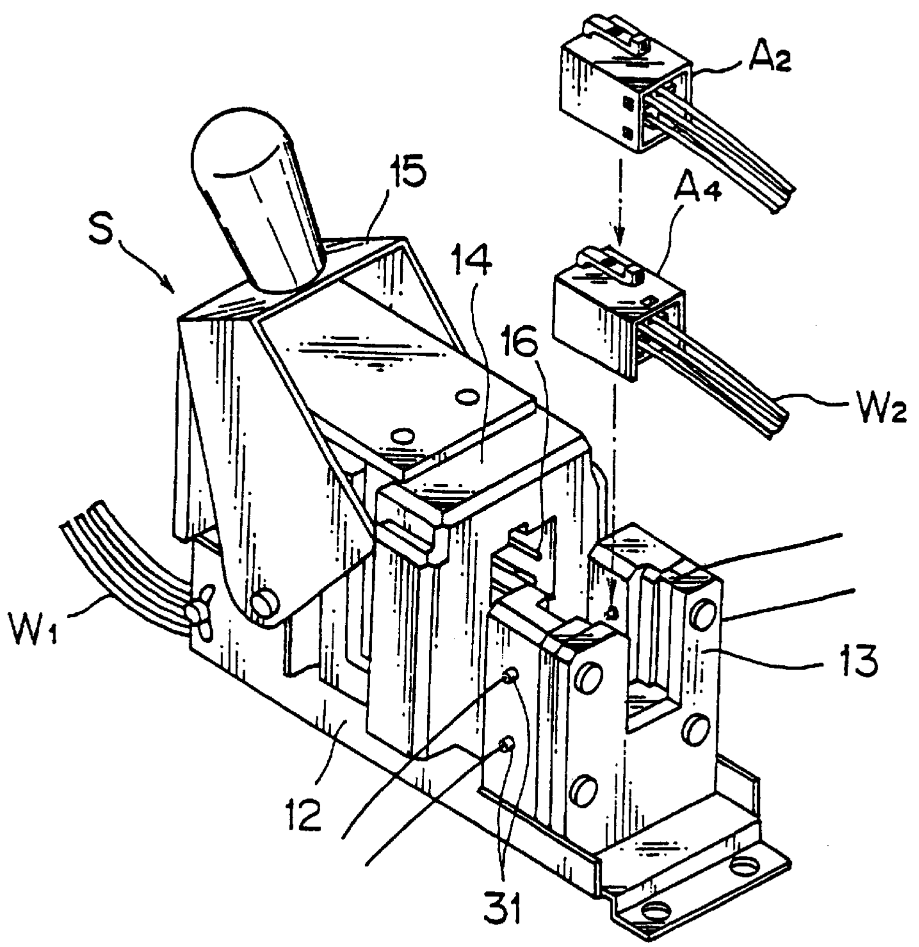
FIG. 18 is a perspective view of a connector detecting device.

FIG. 18 shows a terminal detecting device S of the connector, wherein a connector holding section 13 is fixed onto one side of the base frame 12, and a detecting section 14 provided facing to the connector holding section 13 can be activated by a lever for putting it nearer or farther to or from the holding section 13. In the detecting section 14, 18 electrically conductive pins 16 corresponding to each of the terminal accommodating chambers of the connector A4 are provided, wherein each of the pins 16 is brought into contact with the corresponding terminal and electrically checked by a detecting circuit formed by way of the wires W1 and W2 so as to detect whether or not the terminals have been correctly inserted into the terminal accommodating chambers.

Figure 19:
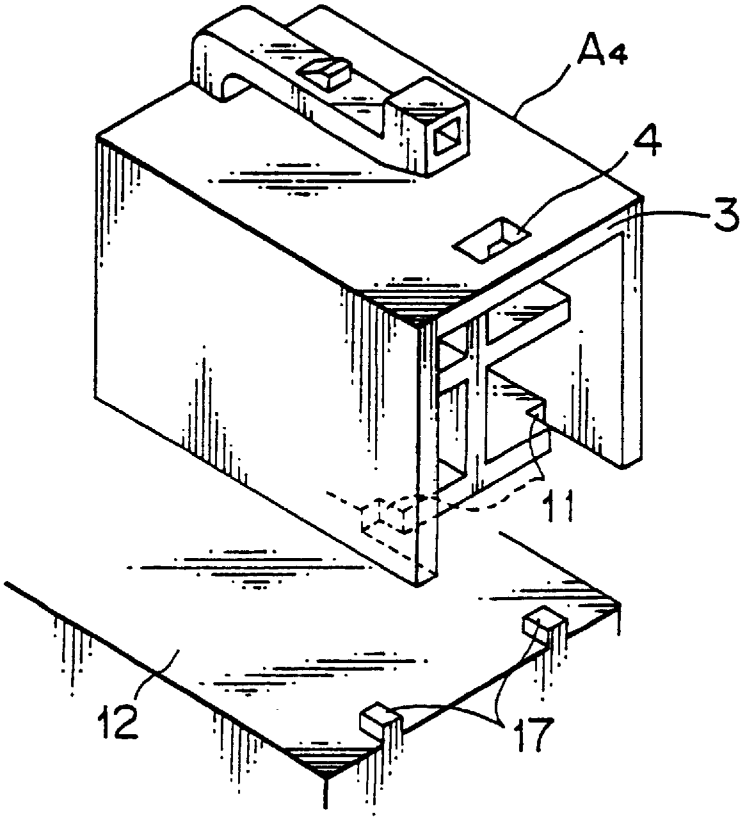
FIG. 19 is an explanatory view showing how the connector is set after the correcting operation of the connector detecting device of FIG. 18.

In this case, on the base frame 12 at the connector holding section 13 a checking projection 17 is protrudedly provided to be received by the openings 11, 11 formed at the rear end of the connector housing A4 (FIG. 19), so that if the correcting operation has not been performed to the final stage, the bridge 11*a* of each opening 11 still exists to hamper a setting of the connector housing A4 on the terminal detecting device S, thereby detecting an incomplete correction of the insertion. It is to be noted that the same detection of the correcting operation of an incomplete insertion of the terminals can be applied to the connector housings A1, A2, A2' and A3 which are all provided with correcting operation checking members formed in the openings provided in the respective peripheral walls to be removed on the correcting operation.

In addition, a checker pin 31 can be provided in the detecting device, as shown in FIG. 18, in order to electrically inform that the parts to be removed on the correcting operation of the above connector housings A1, A2, A2' and A3, are not removed yet.

Figure 20:
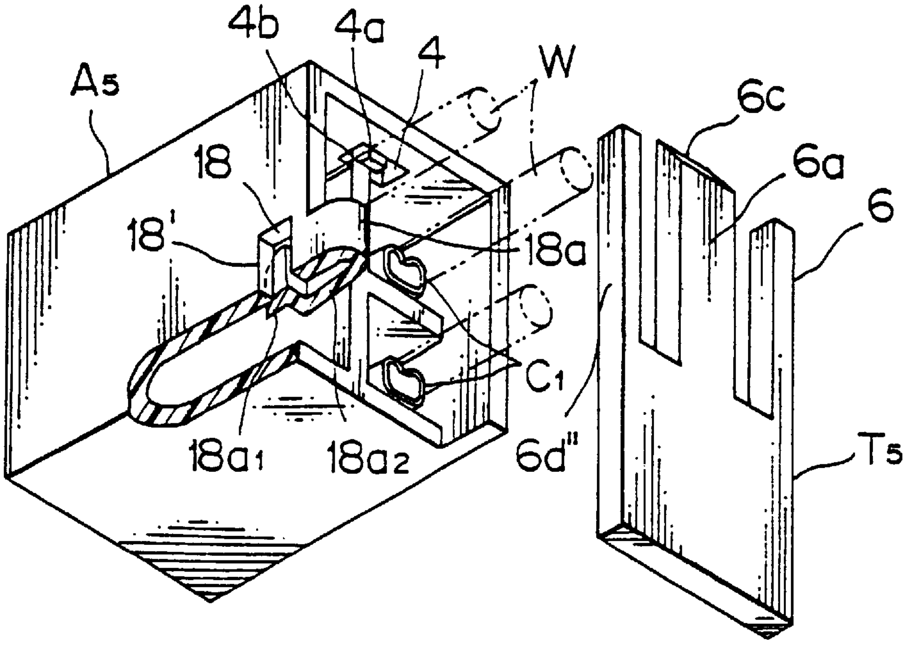
FIG. 20 is a perspective view showing a partly broken connector and an inserted position correcting jig according to another embodiment.

In the embodiment shown in FIG. 20, an opening 18 is provided in one side wall of the connector housing A5, and also at one side periphery 18' of the opening 18, a thin free end 18*a*1 of a correcting operation checking member 18*a* composed of a resilient cantilever is fitted with the periphery 18' from inside thereof.

Figure 21A:
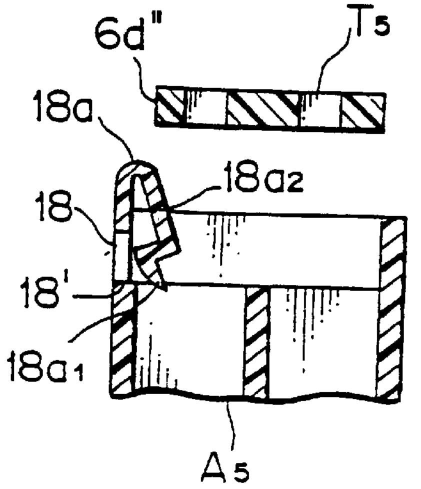
FIGS. 21A and 21B are sectional views respectively showing the state that the correcting operation of FIG. 20 is started, and that the correcting operation thereof is completed.
Figure 21B:
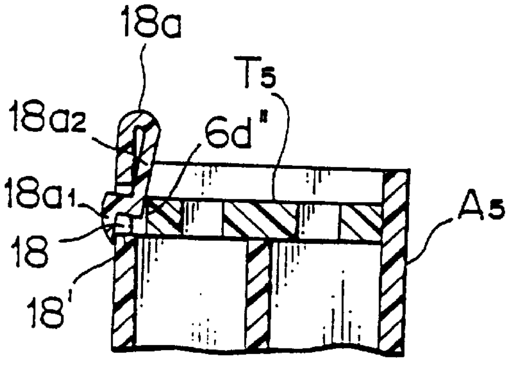

With the construction above, when the pivoting section 6*a* of the pectinate pushing section 6 is inserted into the opening 4 and rotates jig T5 toward the connector housing A5, the pectinate pushing section 6 pushes the incompletely inserted terminal in the same way as mentioned heretofore, and simultaneously one side part 6*d*" abuts against the expanded portion 18*a*2 of the correcting operation checking member 18*a* to push it outwardly, and when the operation is completed, the thin free end 18*a*1 is pushed outside the opening 18 and is maintained at the same state (FIG. 21B).

Figure 22A:
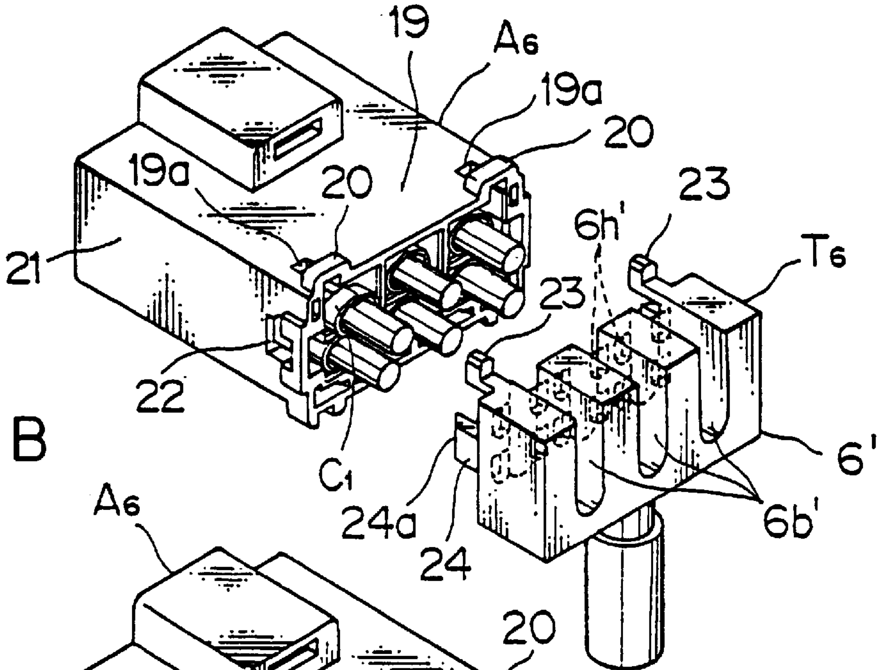
FIGS. 22A, 22*b* and 22*c* are perspective views of another embodiment respectively showing the state that the correcting operation is not started yet, that the correcting operation is just started, and that it is completed.
Figure 22B:
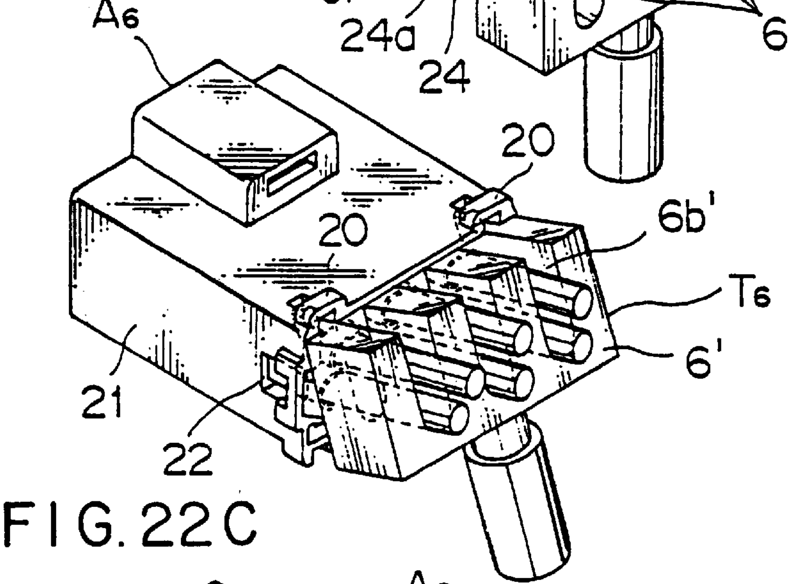
Figure 22C:
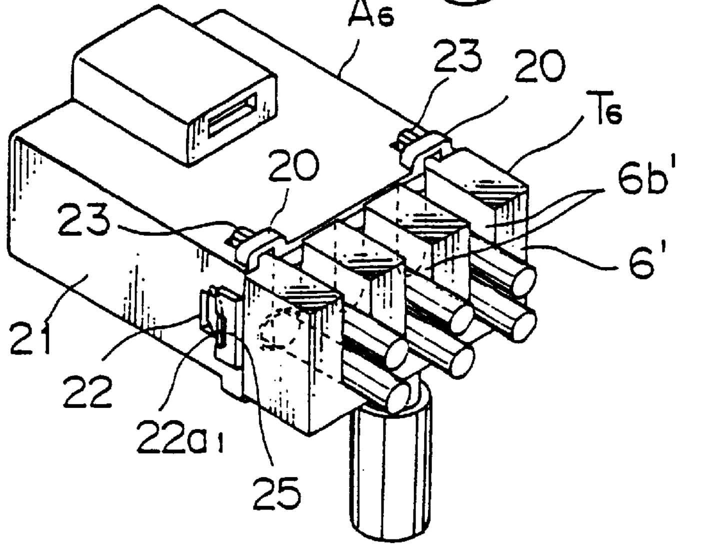
Figure 23A:
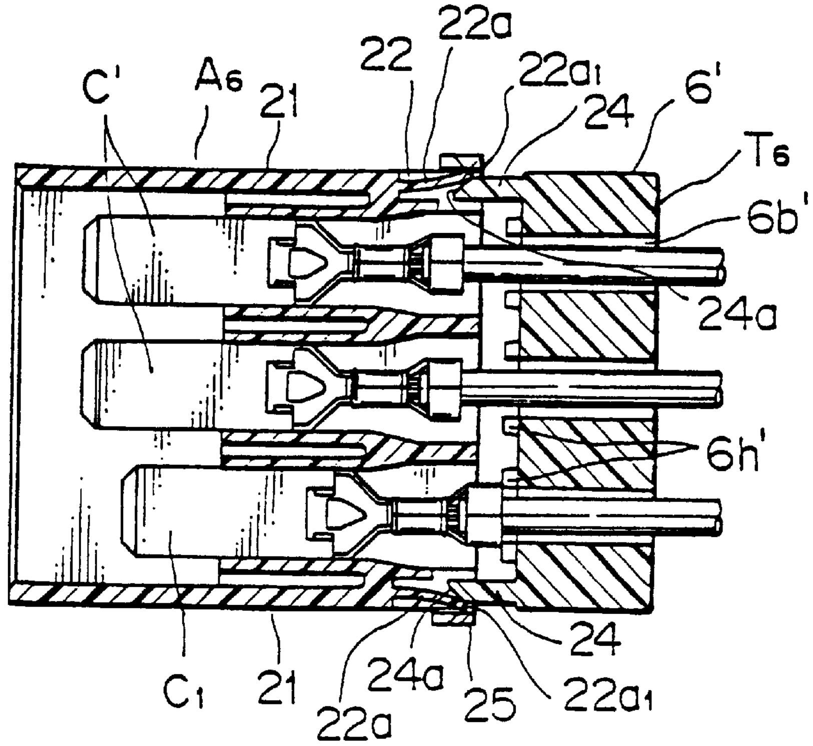
FIGS. 23A and 23B are side sectional views respectively showing the state that the correcting operation is started, and that it is finished.
Figure 23B:
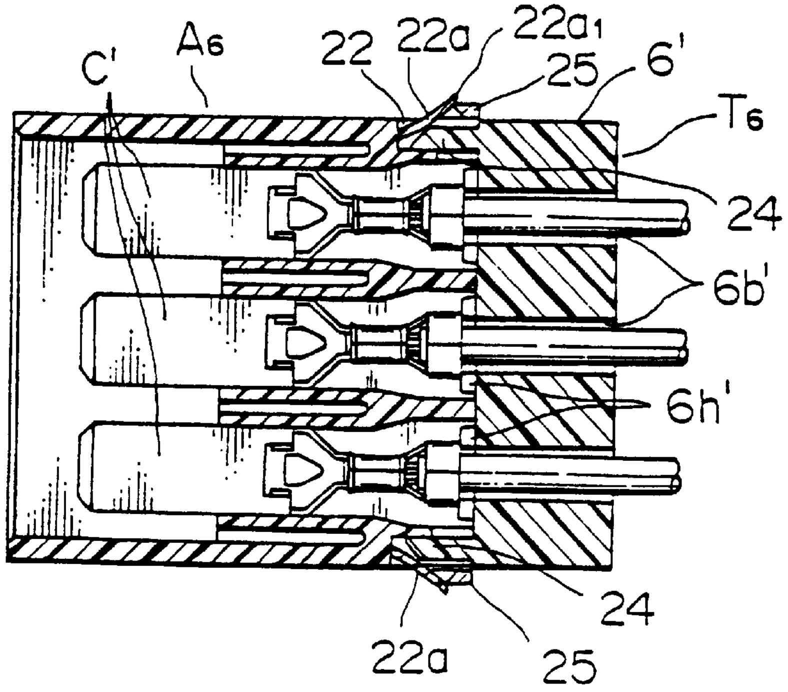

In the embodiment shown in FIGS. 22A, 22B and 22C, at the rear end of the connector housing A6, a notched portion 19 and a frame 20 are integrally formed at the respective side portions in the top wall 19 thereof, an opening 22 is formed at the respective side walls 21, 21, and also inside the each opening 22, a resilient correcting operation checking member 22*a* with respect to the terminal C is formed with its free end 22*a*1 directed rearwardly (FIGS. 23A, 23B).

In the jig T6, a fitting section 23 is formed upright from the forwardly protruded end of the upper front portion of the lateral opposite sides of the jig T6 in such a manner as to intersect with the extending direction of the pectinate portion 6', while below the fitting section 23 an activating piece 24 is protrudedly provided for pushing the correcting operation checking member 22*a*.

In using the jig T6, each of the fitting sections 23 is first inserted into the corresponding frame 20 through the notched portion 19*a* and locked thereby (FIG. 22B), and then by rotating the jig T6 toward the connector housing A6 pivoting on the frame 20 (FIG. 22C), projections 6*h*'respectively formed at the end peripheral portions of the wire accommodating sections 6*b*' abut against wire coat crimped section C1 of the incompletely inserted terminals C'so as to shift the terminals C' to a properly inserted position, and put them to the completely inserted position where the terminals are locked by the resilient pieces.

In rotating the jig T6, when the activating piece 24 is inserted into the correcting operation checking member 22*a* by way of the tapered activating section 24*a* thereof, the free end section 22*a*1 of the checking member 22*a* is forced to deform toward the opening 22 (FIG. 23A), and when the operation is completed, it is pushed outward from the opening 22 to be locked by the stop bar 25 (FIG. 23B).

Figure 24A:
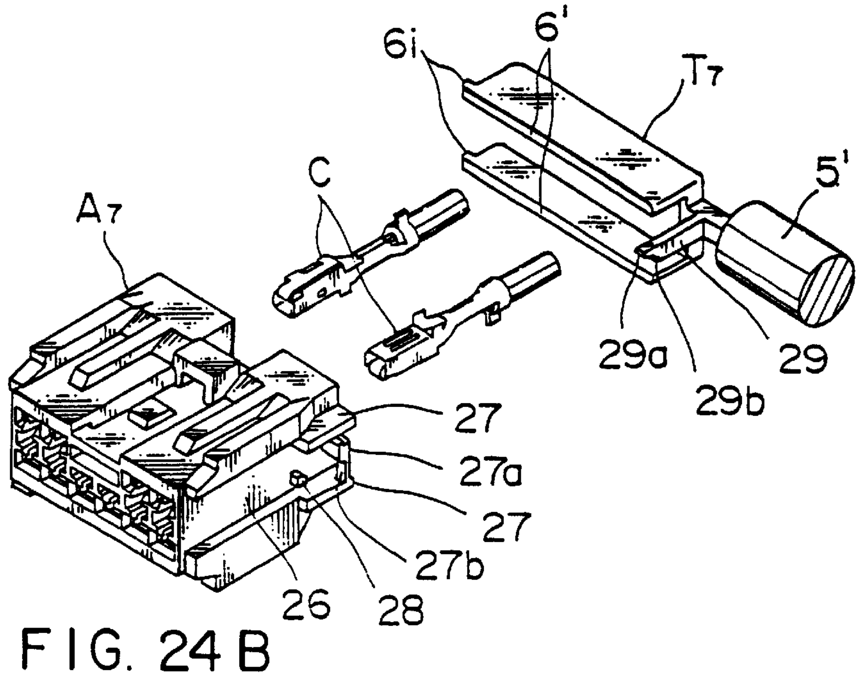
FIGS. 24A, 24B and 24C are perspective views of further embodiment respectively showing an exploded view, a preparation process of the correcting operation, and the correcting operation finished state.
Figure 24B:
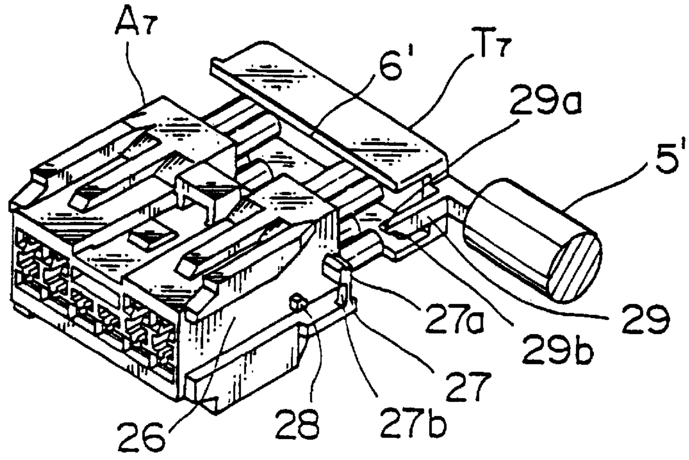
Figure 24C:
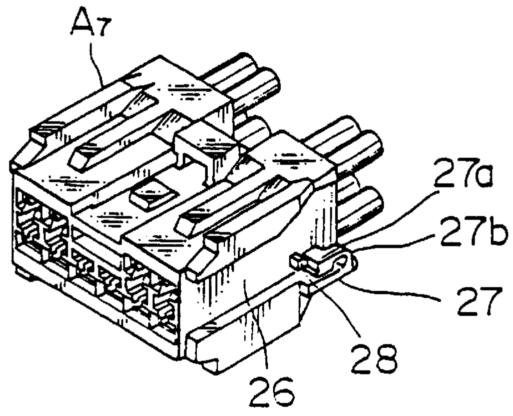
Figure 25A:
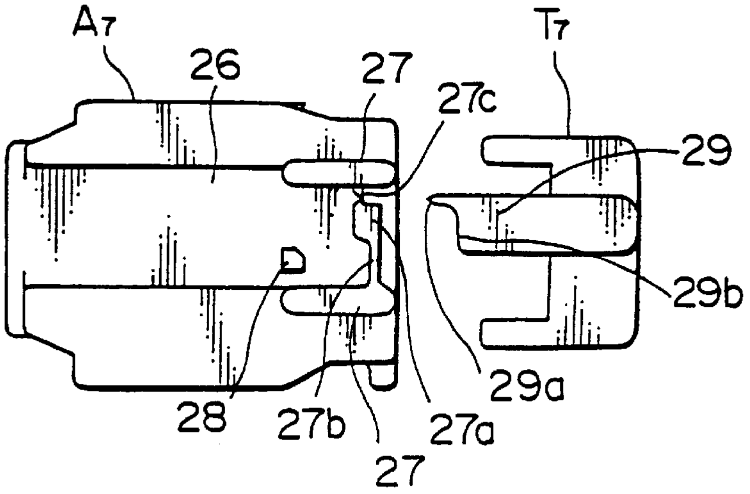
FIGS. 25A, 25B and 25C are side views of the above figures, respectively showing the state that the correcting operation is not started yet, that the correcting operation is just started, and that it is completed.
Figure 25B:
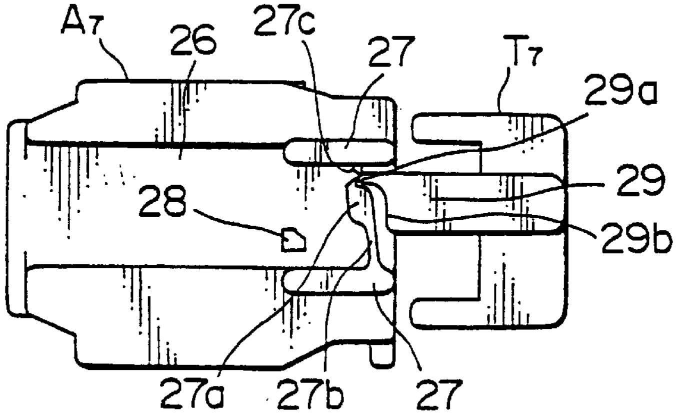
Figure 25C:
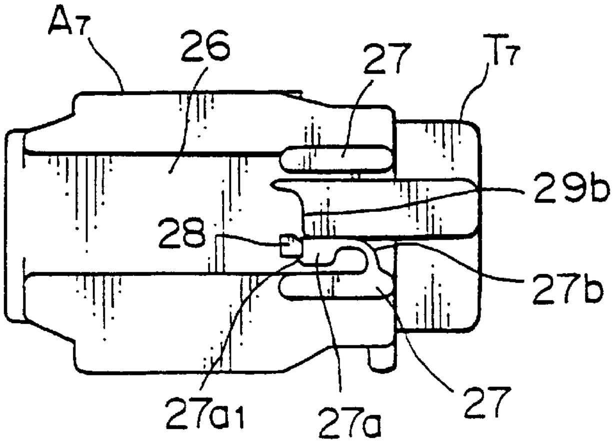

In the embodiment shown in FIGS. 24A and 24B, between a pair of vertically aligned protecting projections 27, 27 at the rear end of one side wall 26 of the connector housing A7, a correcting operation checking member 27*a* is provided in a bridge-like form by way of a resilient hinge 27*b* and a thin supporting section 27*c*, while provided in the forward direction of the correcting operation checking member 27*a* formed on the side wall 26 is a locking projection 28.

In the jig T7, each of a pair of pushing sections 6', 6'provided to the holding section 5' is formed respectively with a pivot projection 6*i*, an activation rod 29 is provided between the holding section 5' and the pair of pushing sections 6',6', which rod 29 being further formed with a blade section 29*a* and an activating section 29*b* at the front portion thereof.

Figure 26A:
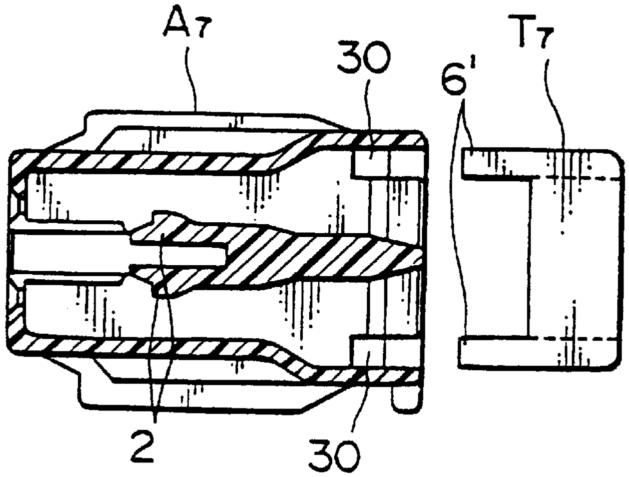
FIGS. 26A, 26B and 26C are sectional views of the same, respectively showing the state that the correcting operation is not started yet, that the correcting operation is just started, and that it is completed.
Figure 26B:
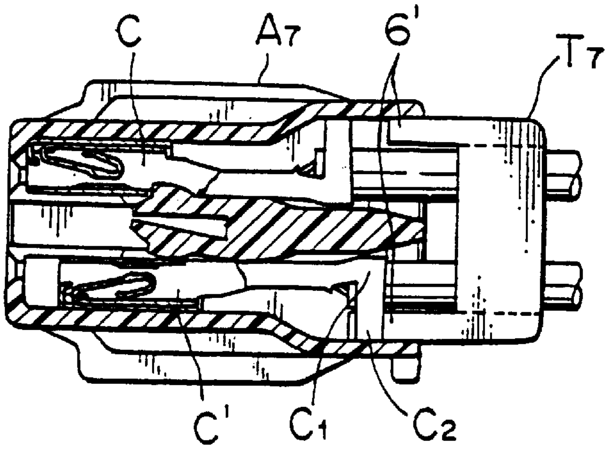
Figure 26C:
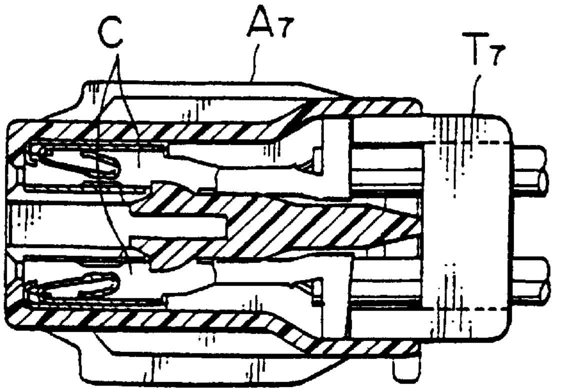
Figure 27:
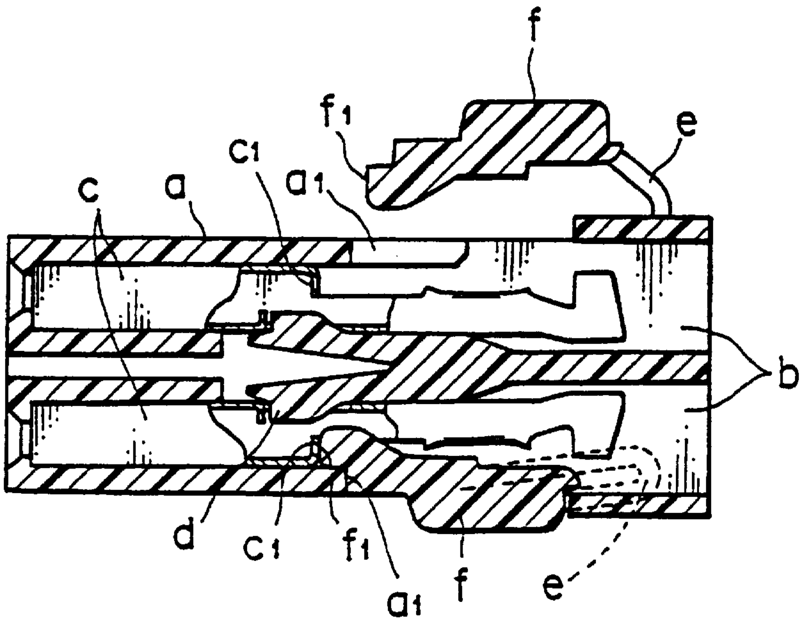
FIG. 27 PRIOR ART
FIG. 27 is a sectional view of a prior art.
Figure 28:
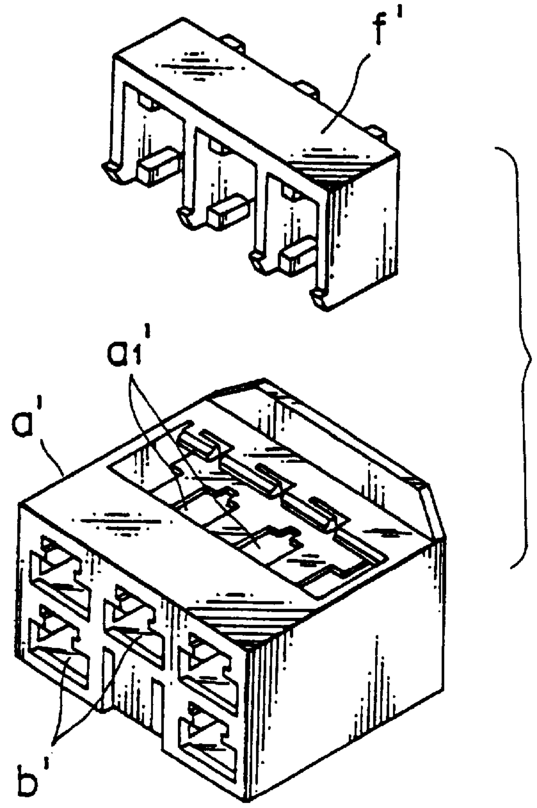
FIG. 28 PRIOR ART
FIG. 28 is a perspective view of another prior art.

When using the jig T7, each of the pivot projections 6*i* is first fitted into an opening 30 formed in the side wall of the connector housing A7 (FIG. 26A), and then the holding section 5' is rotated toward the connector housing to fit the pushing section 6' thereof to the upright piece C2 of the wire crimped portion C1 provided at the rear end of the incompletely inserted terminal C' to shift the terminal to a perfectly inserted position where it is locked by the resilient piece 2 (FIGS. 26B, 26C).

During the rotating operation of the jig T7, the blade section 29*a* of the activation rod 29 first cuts the thin supporting portion 27*c* and at the same time the activating section 29*b* pushes the correcting operation checking member 27*a* in the lower diagonal direction, bending the resilient hinge section 27*b* simultaneously, whereby the projection 27*a*1 of the member 27*a* is engaged with the locking projection 28 to be locked thereby.

In this embodiment, since the correcting operation checking member 27*a* is provided at the external side of the side wall, and exposed outside, the deformation of the correcting operation can be easily observed from outside, and in addition, the deformed state of the checking member 27*a* is securely maintained between a pair of protecting projections 27, 27.

[Effect of the Invention]

Since the present invention is constructed as above, an incompletely inserted terminal in a connector housing is shifted to a perfectly inserted position and securely locked in the perfectly inserted position by operating an inserted position correcting jig, and also whether or not the correcting operation is done can be checked by a removal or deformation of the correcting operation checking member, and further since an opening, which is enlarged by the removal of the correcting operation checking member, receives a fitting member at a predetermined position of a base frame of an electrical conduction checking tool and thereby to enable a setting of the connector, a perfectly locked state of the terminal can be further checked.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A connector housing and jig, comprising:

a terminal accommodating chamber provided in said connector housing and having a top wall and a bottom wall;

a peripheral wall extending from said terminal accommodating chamber and having a first opening at a top rear end of said peripheral wall;

a first correcting operation checking member provided on said first opening of said connector housing;

a second opening provided on a rear end of said bottom wall of said terminal accommodating chamber;

a second correcting operation checking member provided in a bridge-like shape within said second opening of said connector housing; and a single jig having both a first cutting-edge portion and a second cutting-edge portion, said jig being pivotable about said first opening when inserted into said connector housing, wherein said first and second correcting operation checking members are removed by said first and second cutting-edge portions, respectively.

* * * * *